May 12, 1964    J. PIGNONE ETAL    3,132,560
FILM HOLDER

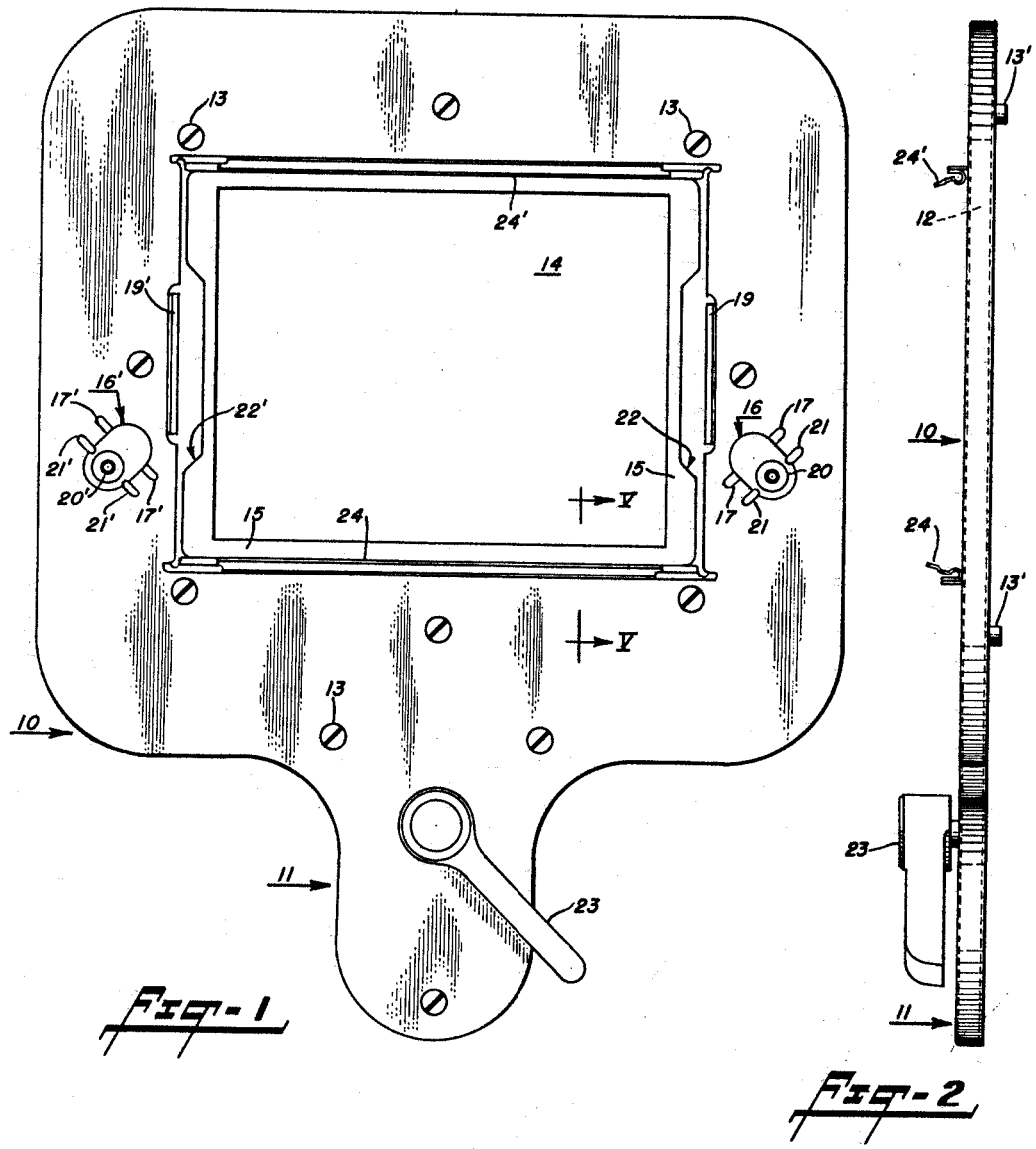

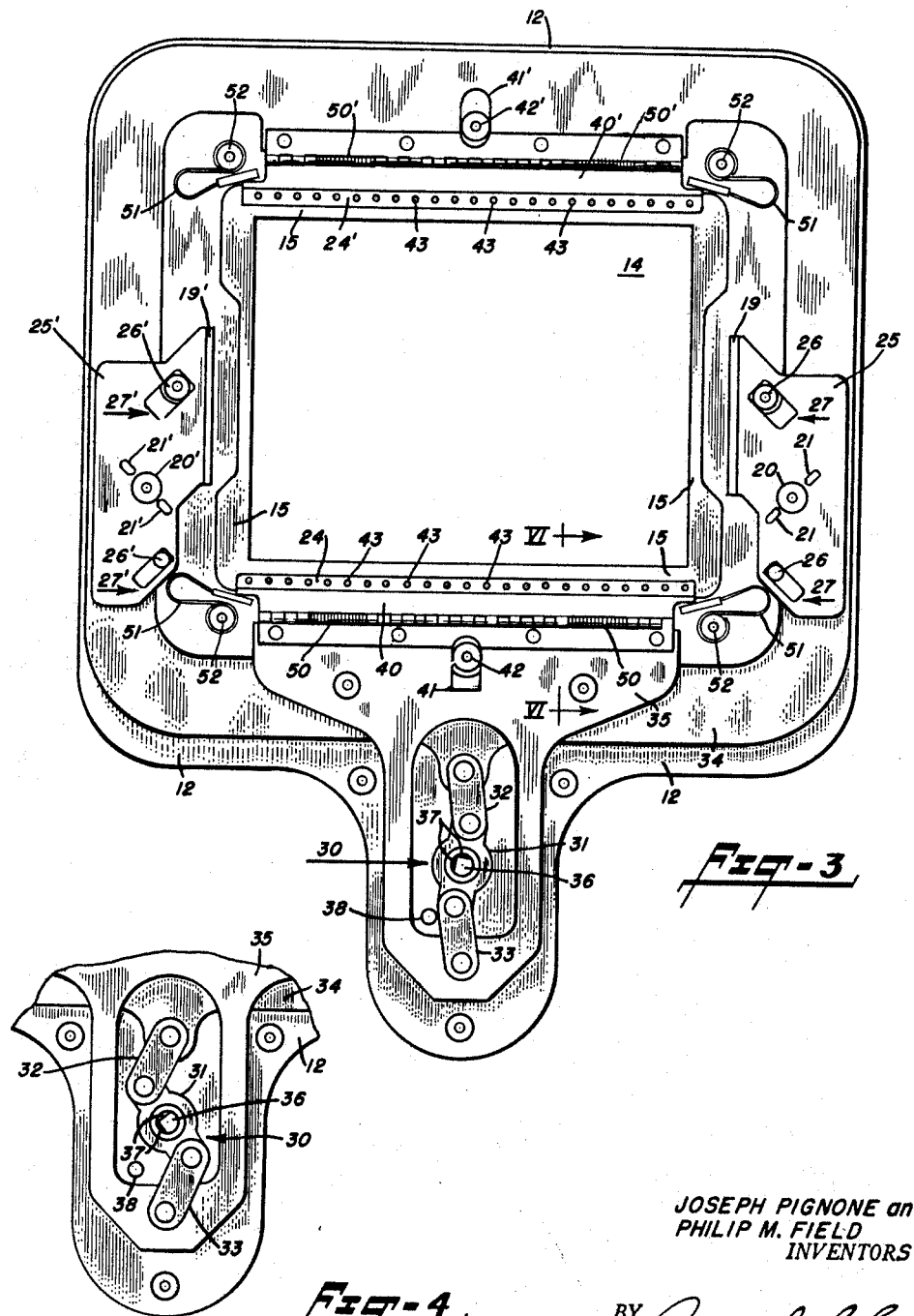

Filed June 21, 1961    4 Sheets-Sheet 3

JOSEPH PIGNONE and
PHILIP M. FIELD
    INVENTORS

BY
Rudolph J. Jurick
    ATTORNEY

May 12, 1964  J. PIGNONE ETAL  3,132,560
FILM HOLDER

Filed June 21, 1961  4 Sheets-Sheet 4

JOSEPH PIGNONE and
PHILIP M. FIELD
INVENTORS

BY
ATTORNEY

United States Patent Office 3,132,560
Patented May 12, 1964

3,132,560
FILM HOLDER
Joseph Pignone, West Orange, and Philip M. Field, Maplewood, N.J., assignors to Charles Beseler Company, East Orange, N.J., a partnership
Filed June 21, 1961, Ser. No. 118,654
11 Claims. (Cl. 88—24)

This invention relates to a film holder and more particularly to an improved film holder in which the film, or negative, is firmly held in a plane surface without the use of glass plates, or the like.

Negative holders are well known in the art and are generally used to support a photographic film in as nearly mono-planar disposition as possible so as to obtain a uniformly sharp photographic print when the negative is positioned in the negative stage of a photographic enlarger. Photographic film material, particularly in the larger sizes, generally deviates from a plane surface by reason of buckling, localized curvatures and undulations brought about by temperature and/or humidity changes, handling, etc. Additionally, the film material may develop such undesirable faults even when supported in present film holders, because of the continued heating thereof in an enlarger.

One type of prior art film holder comprises a pair of frame-like members, one or both of which are apertured to a predetermined size, and between which the film is nested and retained. The frames are hinged together and a clamp action for pressing the frame members together is derived from pressure in the gate, or negative stage, of the photographic enlarger or similar projection device. This type of film holder is generally referred to in the art as a glassless type. However, this type of film holder does not correct for inherent surface deviations in the film, nor does it prevent surface deviations from developing during the enlarging or projecting operation. In another type of known film holder, the film is retained between glass plates thereby affording a measure of improvement over the glassless type. The objections to the glass plate type of holder lie in the introduction of optical aberrations and loss of color fidelity from inferior glass, the introduction of a phenomenton known as Newton rings, and the constant requirement for maintaining the glass surfaces spotlessly clean.

A film holder made in accordance with our invention overcomes the defects of existing devices. Briefly, the improved film holder is designed to grip opposite edges of a film, to mechanically draw the film to a taut state, and unyieldingly retain the film in tension under working conditions of continued heat and variation of moisture content.

An object of this invention is the provision of a film holder which positively grips a film placed therein and retains the film in a taut state.

An object of this invention is the provision of a film holder comprising spaced base and cover plates between which a pair of actuators are mounted for simultaneous movement in opposite directions, and clamping means for gripping opposed edges of the film and applying a tension force thereto upon movement of the actuating members.

An object of this invention is the provision of a film holder comprising two pairs of film-clamping jaws disposed along four surfaces defining a light opening in the holder, and actuating means for simultaneous movement of the jaws to the film engaging position and for simultaneous movement of the jaws in a direction away from the light opening.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a top plan view of a film holder embodying the invention;

FIGURE 2 is an elevational end view thereof;

FIGURE 3 is similar to FIGURE 1, but with the cover plate removed and showing the toggle linkage in the film-gripping position;

FIGURE 4 is a fragmentary view of the handle portion of the base plate and showing the toggle linkage in the normal position, that is, with the operating handle in the position shown in FIGURE 1;

Figure 5:
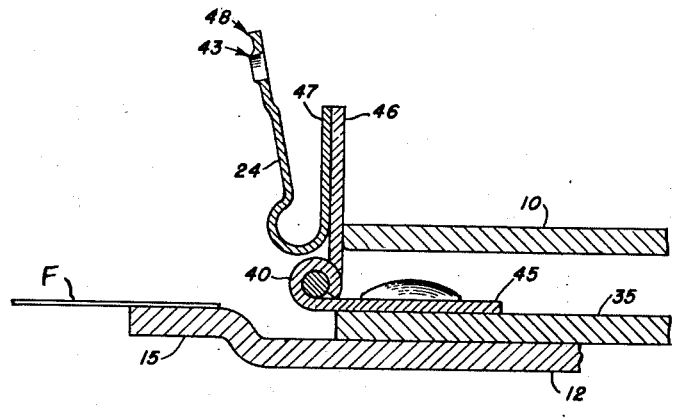
FIGURE 5 is an enlarged, fragmentary, cross-sectional view taken along the line V—V of FIGURE 1.

Reference is first made to FIGURES 1 and 2 which show the film holder in assembled form. The reference numeral 10 designates a cover plate terminating in a handle portion 11, said cover plate having integral, downwardly-extending side walls which fit snugly over the edges of a similarly-shaped base plate 12. A plurality of screws 13, threaded into upstanding bosses provided in the base plate, secure the two plates together to thereby form a paddle-shaped housing. A generally rectangular opening 14 is formed in the central portion of the base plate, which opening is somewhat smaller than the dimensions of the film, or negative, to be held by the device. It is here pointed out that the opening 14 is formed in a raised portion of the base plate such that the ledge surface 15 constitutes a platform for peripheral support of the film. A generally corresponding opening is formed in the cover plate 10 but such opening is somewhat larger than that of the base plate for purposes which will become apparent as the description proceeds. Locating pins 13' (FIGURE 2) extend from the base plate for the purpose of locating the device in proper position in the negative stage of an enlarger, as is well known in the art.

Although a film holder is designed to accommodate a film of a given nominal size, the actual length of cut film differs from that of comparable pack film. Consequently, it is desirable to provide means whereby the user may adjust the film holder for the particular film to be secured therein. For this purpose, the cover plate 10 is provided with a pair of oblong holes 16, 16' communicating with aligned pairs of transverse slots 17, 17'. Disposed between the cover and base plates are a pair of oppositely disposed, manually-adjustable stop plates, each plate having an upturned edge 19, 19' which intersects the plane of the surface of the film platform 15. Secured to each such stop plate are finger-operable buttons 20, 20' which extend through the associated oblong holes 16, 16' and which have top surfaces substantially flush with the surface of the cover plate 10. Also formed in each stop plate are a pair of aligned detents 21, 21' adapted to fit snugly within one or the other associated pair of the transverse slots. As shown in FIGURE 1, the detents are disposed within the lower transverse slots, in which position the spacing between the upturned edges 19, 19' is a maximum. In order to condition the device for acceptance of a film having a somewhat shorter length, the user presses upon the buttons 20, 20', in a downward-forward manner, to move the detents 21, 21' into the upper pair of transverse slots, thereby bringing the ends of the edges 19, 19' closer together. It will be apparent that this arrangement affords a convenient, positive means for conditioning the device for acceptance of films of two different sizes. The raised portion of the base plate is narrowed as indicated by the numerals 22, 22' to provide a clearance area for the respective stop plate ends 19, 19'.

An operating lever 23 is pivotally carried by the handle of the device for convenient one-hand operation. At present, it is pointed out that the lever 23 is mechanically coupled to a pair of opposed, spring-type jaws, or clamping members 24, 24', which jaws are designed to grip opposed ends of the film and apply tension thereto as the lever 23 is rotated clockwise from the illustrated position to a position substantially along the vertical center line of the device.

Reference now is made specifically to FIGURE 3, which is similar to FIGURE 1, but with the cover plate removed. Here are shown the stop plates 25, 25', with the respective operating buttons 20, 20' and the indexing detents 21, 21'. Each stop plate is supported upon the shoulders of studs 26, 26' with the reduced-diameter, free ends of the studs disposed within associated rectangular openings 27, 27' formed in the plates. Each stop plate is made of a spring material and slightly bowed in a direction such that the associated operating buttons are biased in an upward direction normal to the plane of the base plate. Alternately, each stop plate may be biased in this direction by suitable spring members disposed between the stop plate and the base plate. In any event, with the cover in place, the stop plates may be moved to one or the other position (as defined by the transverse slots 17, 17' (see FIGURE 1)) by pressing upon the buttons 20, 21, and slidably directing the stop plates in the desired direction.

When the operating lever 23 is in the normal position, as shown in FIGURE 1, the film gripping jaws 24, 24' extend upwardly of the cover plate as best shown in FIGURE 2. When, on the other hand, the operating lever is rotated clockwise to a vertical position, the jaw members lie in the plane of the cover plate, as shown in FIGURE 3. The movement of the jaw members from the FIGURE 1 to the FIGURE 3 position results in a gripping and stretching of the film, as will be described in detail hereinbelow with reference to FIGURES 5 and 6. Movement of the jaws in response to rotation of the operating handle, is accomplished through a toggle mechanism 30 carried in the handle portion of the base plate 12.

Reference, for the present, is made to FIGURE 4 wherein the toggle mechanism 30 is shown in the normal position. A central link 31 is pivotally attached to an upper link 32 and a lower link 33 which links are pivotally attached, respectively, to a lower slide plate 34 and an upper slide plate 35. The central link has an upstanding shaft 36 brazed thereto, the lower end of the shaft extending through a hole formed in the central link and into a close-fitting bearing bore provided in the base plate. The upper end of the shaft protrudes through an appropriate hole formed in the cover plate and is provided with two flat sections 37 so that the handle may be firmly secured to the shaft by means of two set screws after the cover plate is in assembled position relative to the base plate. It will be apparent, therefore, that rotation of the operating handle results in a corresponding rotation of the central link 31 about an axis defined by the shaft 36. A clockwise rotation of the handle, therefore, will result in a sliding movement of the slide plates 34 and 35 in opposite directions. Specifically, the lower slide plate 34 will slide upwardly, whereas the upper slide plate 35 will slide downwardly, as viewed in FIGURE 3. The limit of rotation of the toggle mechanism is defined by the position of a stop pin 38 secured in fixed position on the base plate and extending into the path of travel of the central link 31.

The relative positions of the members of the toggle mechanism (and of the slide plates 34, 35) when the operating handle is rotated to the maximum, clockwise extent, is shown in FIGURE 3, to which reference is again made. It will be noted that the links 31, 32 and 33 are almost in vertical alignment. In fact, the central link 31 has passed dead center by a very small angle, specifically, about one degree. This slight excursion of the central link beyond dead center results in a minute movement of the slide plates 34, 35 toward each other but such reverse movement of these plates does not noticeably affect the gripping action of the film gripping jaws or the film, which action is described in detail hereinbelow. More importantly, in this position of the toggle mechanism, the slide plates 34, 35 cannot be moved to their original relative positions by any force other than a counterclockwise rotational force applied to the central link member. Consequently, once the operating handle has been rotated fully in the clockwise direction, the film remains drawn taut until it is desired to remove the film from the holder.

The film-gripping jaw 24 is secured to one leaf of an elongated hinge member 40, the other leaf of the hinge member being secured to the end of the upper slide plate 35 proximate to the film platform 15. Similarly, the opposite film-gripping jaw 24' is secured to a leaf of a hinge member 40', the other leaf of which is secured to the lower slide plate 34, it being noted that the slide plate 34 is an open, generally-rectangular frame extending peripherally around the base plate 12 and being disposed under the guide plates 25, 25'. The slide plates 35 and 34 are respectively provided with rectangular slots 41, 41' accommodating the posts 42, 42', which serve as guides to secure a linear movement of the two plates upon rotation of the toggle mechanism 30. Each of the film-gripping jaws 24, 24' preferably are provided with a plurality of detents, or craters, 43, 43' to assure a firm gripping action against the film.

The action of the film-gripping jaws will now be described with specific reference to FIGURES 5 and 6, which are fragmentary, enlarged views taken, respectively, along the line V—V of FIGURE 1 and VI—VI of FIGURE 3. For purposes of description, the cover plate 10 is shown in place in FIGURE 6 as well as in FIGURE 5. These views clearly show the raised, central portion of the base plate 12, which raised portion constitutes the platform 15 for peripheral support of the film, here identified by the letter F. One leaf 45, of the hinge 40, is riveted to the surface of the upper slide plate 35 while the other leaf 46 has welded thereto an integral arm 47 of the jaw member 24, said jaw member being provided with a plurality of indenting craters 43. These individual craters are made by punching holes in the jaw members by means of punches having slightly rounded ends thereby resulting in circular, sharp, burrs extending from the back surface of the material. In actual practice, the jaw members are made of spring material approximately .013" thick, the punched holes are approximately .035" in diameter and the resulting circular burr extends about .007". In addition to the circular burrs, there is also a continuous, sharp, burr 48 formed along the entire free edge of the jaw member, such burr being formed when the jaw member is punched from the stock material.

Figure 6:
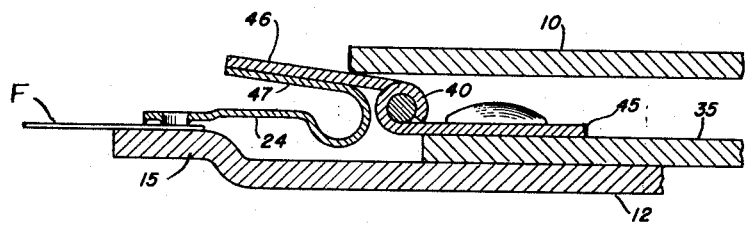
FIGURE 6 is similar to FIGURE 5 but taken along the line VI—VI of FIGURE 3 to show the film-gripping jaws in the closed position.

FIGURE 5 shows the jaw in the normal, open position, as shown in FIGURE 2, such open position corresponding to the normal position of the operating handle 23, as shown in FIGURE 1. As described hereinabove, rotation of the operating handle to a position along the axis of the handle of the device, causes the upper slide plate 35 (see FIGURE 3) to move toward the handle. Such movement of the slide plate 35 (toward the right, as viewed in FIGURE 5) will result in a counterclockwise flexing of the hinge leaf 46 since the cover plate 10 remains in fixed position. Just before the slide plate reaches its limit of movement, the burrs 43, on the jaw 24, engage the film F. It will be noted that the hinge 40 is drawn under the cover plate 10 (FIGURE 6) whereby the sliding movement of the hinge leaf 40 against the edge of the cover plate results in a camming action effectively increasing the pressure of the jaw 24 against the film. Consequently, continued movement of the slide plate 35 causes the burrs 43 to bite into the film and then draw the edge of the film to the right. The arrangement is such that the burrs 43 do not puncture through the film yet grip the film so that a positive, tensioning force is applied thereto. The plurality of circular burrs spaced along the jaw 24 may result in small undulations along the film edge. However, the continuous burr 48 also bites into the film slightly as the slide plate 35 approaches the limit of movement. This continuous burr smoothes out such minor undulations of the film so that the film surface overlying the light opening is smooth, as well as taut.

The cooperating jaws 24' (see FIGURE 3) operate simultaneously in the same manner, but in a reverse direction. It will be apparent, therefore, that the arrangement results in a firm grasping of opposite ends of the film and the application thereto of a tension force which causes the film to become taut and mono-planar in disposition. The amount of pressure exerted upon the film by the gripping jaws will depend upon the characteristics of the U-shaped spring formed of the integral jaw and arm and the amount of tension applied to the film depends upon the extent of movement of the two slide plates after the jaws have been pressed against the film. Inasmuch as the film-gripping action results in a penetration of the film to only a relatively insignificant extent, there is no limit as to the number of times a particular film can be inserted into the film holder.

The hinges 40, 40', see FIGURE 3, are spring-loaded as by the respective coiled springs 50, 50' so that the jaws 24, 24' will positively return to the open position shown in FIGURE 5 when the operating handle is returned to its initial position. When in the open position, the jaws offer no obstruction to the placement of the film on the platform of the device or the removal of the film therefrom.

Referring, again, to FIGURE 3, there are shown four leaf springs 51 each having an end affixed to an associated post 52. The free ends of the springs extend through the plane of the film platform 15 and serve to position the film so that if the device is tilted, the film will not slide out of registry with the jaws before the jaws are brought to the film-gripping position. As the jaws are moved to the film-gripping position, a rear edge of each jaw contacts the associated springs 51 thereby moving the springs out of the path of the film. This arrangement prevents possible crimping of the film edge arising by a displacement of the film from the tensioning action of the clamping jaws, as would be the case when the edge of the film is nested against rigid stops.

The film holder constructed as described to this point, is satisfactory for general use and provides a means for firmly holding a film in tension in a manner far better than devices heretofore available. In the case of larger films, the undulations in the film are more pronounced and a simple stretching of the film along one axis may not place the film in a mono-planar disposition. For such use, we provide a four jaw arrangement wherein all jaws operate simultaneously and wherein opposed pairs of jaws move in reverse directions so that a tension force is applied to the clamped film along two, normal axes.

Figure 7:
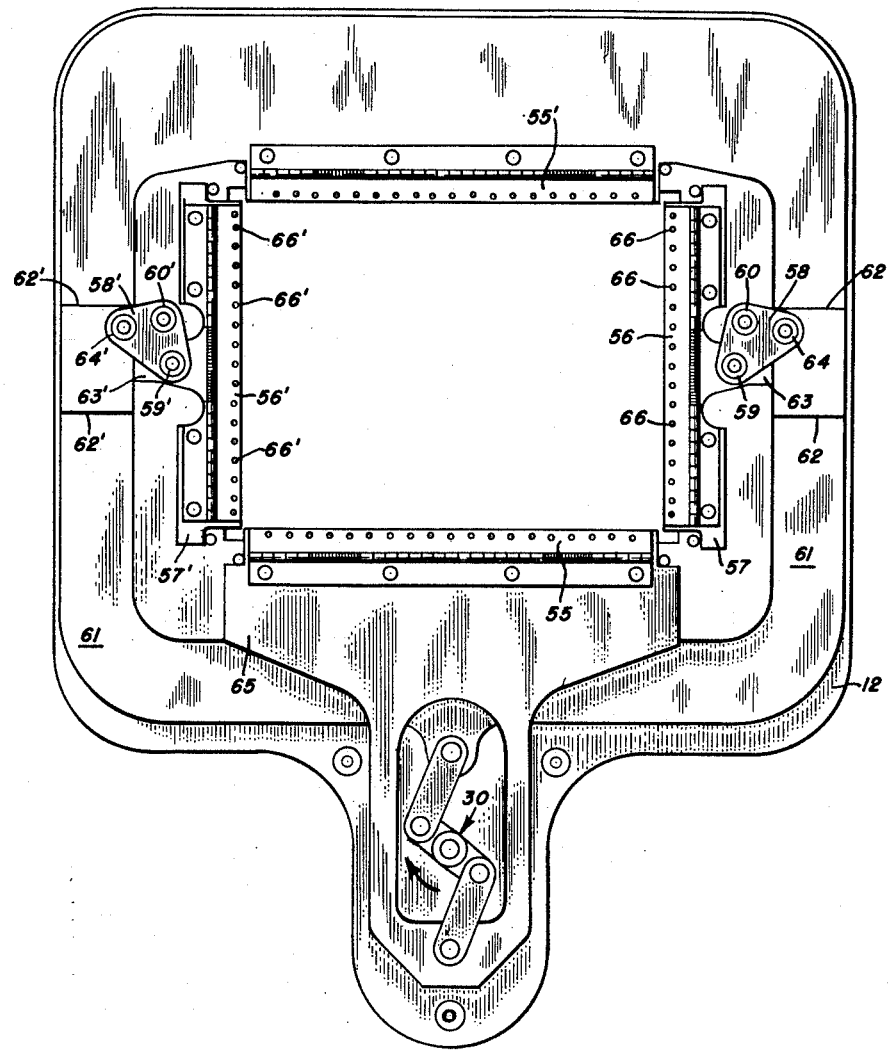
FIGURE 7 is similar to FIGURE 3 but showing a four-jaw device.

The four jaw arrangement is shown in FIGURE 7, which corresponds generally to FIGURE 3, that is, a showing of the operating components with the cover plate removed. In this case, the cooperating clamping jaws for tensioning the film along one axis are identified by the numerals 55, 55' and the cooperating clamping jaws for tensioning the film along the other axis are identified by the numerals 56, 56'. The latter jaws are secured to transverse slide plates 57, 57', respectively, which plates are pivotally connected to associated swivel plates 58, 58', as by rivets 59, 59'. The swivel plates are pivotally carried by bearing posts 60, 60' formed in the base plate 12. The longitudinally-extending side arms of the lower slide plate 61 are bent upwardly slightly at the points 62, 62' to provide a clearance area for the tail portions 63, 63' of the transverse slide plates, which tail portions are provided with slots accommodating fixed pins extending from the base plate. Each of the swivel plates 58, 58' is pivotally attached to the raised portion of the lower slide plate 61, as by the pins 64, 64' such that vertical movement of the slide plate (as viewed in the drawing) will cause a corresponding movement of the transverse slide plates 57, 57' toward or away from each other. Thus, when the toggle mechanism 30 is rotated in the direction of the arrow (from the open to the closed position) the lower slide plate 61 will move downwardly, the upper slide plate 65 will move upwardly, the transverse slide plate 57 will move to the right and the transverse slide plate 57' will move to the left. Thus, all clamping jaws close simultaneously against the four edges of the film. The opposed jaws 55, 55' are provided with a plurality of circular burrs and a continuous burr similar to the circular burr 43 and continuous burr 48 shown in FIGURE 5. The other set of opposed jaws 56, 56' are each provided with a plurality of detents 66, 66' which detents are of small diameter but presenting a smooth surface for engagement with the film. Thus, all four jaws will apply a tensioning force to the film. However, although the jaws with the smooth surface detents grasp and draw the film lengthwise along one axis, the film will slip in response to the drawing of the film along the transverse axis by the clamping jaws which positively bite into the film. This results in the film being drawn taut in two directions.

From the above description, the ease of assembling the film holder will be clear. All of the component parts and sub-assemblies are simply dropped into holes, slots and studs formed in the base plate, after which the cover plate is secured in position. The device is designed to be held and operated conveniently in one hand.

Having now described our invention in detail, those skilled in this art will find no difficulty in making changes and modifications in the specifically illustrated constructions. Such changes and modifications may be made without departing from the scope and spirit of the invention as set forth in the following claims.

We claim:

1. A film holder comprising a flat housing; means forming a light opening through the housing; means for peripherally supporting a film over the light opening; a pair of jaw members secured to the housing and disposed on opposite sides of the light opening, each jaw member extending substantially the full length of the light opening and normally spaced from the film surface; actuating means movable from a first to a second position in the plane of the housing; means imparting a simultaneous rotary and translatory movement to the jaw members upon movement of said actuating means to the second position, thereby to bring the jaw members into engagement with the marginal surface of the film and to apply a tension force thereto; and operating means for moving the said actuating means from the first to the second position.

2. The invention as recited in claim 1, wherein the housing terminates in a handle portion carrying the said operating means, and including means forming a plurality of spaced burrs along an edge of each jaw member, and means forming a continuous burr along the said edge of each jaw member, the said burrs engaging the film surface upon rotary and translatory movement of the jaw members.

3. A film holder comprising a housing having a light passage formed therein, said housing terminating in a handle portion; platform means for peripherally supporting a film over the light passage; a pair of slide plates mounted for linear movement within the housing; an operating lever carried by the handle portion of the housing and rotatable between a first and a second position; coupling means between the operating lever and the slide plates for effecting reverse movement of the slide plates upon rotation of the operating lever; a pair of jaw members disposed on opposite sides of the light passage and individually secured to the slide plates, said jaw members being spaced from the surface of the platform means when the operating lever is in the first position; and fixed means cooperating with the slide plates for bringing the jaw members into engagement with the surface of the platform means when the lever is rotated to the second position.

4. The invention as recited in claim 3, wherein the said jaw members are secured to one leaf of a cooperating hinge member, with the other leaf of the hinge member secured to the cooperating slide plate, and wherein the said fixed means comprises a wall defining an opening in the cover plate.

5. The invention as recited in claim 4, wherein the hinge members are spring loaded.

6. The invention as recited in claim 3, wherein the said coupling means is a toggle-action mechanism.

7. The invention as recited in claim 3, including a leaf spring spaced from each corner of the light passage, said leaf springs having portions adapted for engagement by the edges of a film carried by the platform means when the jaw members are spaced from the surface of the platform means and said leaf springs being flexed by the jaw members to a spaced position relative to the film when the jaw members engage the surface of the platform means.

8. A film holder comprising spaced base and cover plates forming a housing having a rectangular light passage extending therethrough, said housing terminating in a handle portion; platform means for peripherally supporting a film over the light passage; a pair of slide plates mounted for linear movement within the housing; one plate having an end coextensive with and proximate to one side of the light passage and the other plate having one end coextensive with and proximate to the opposite side of the light passage; a first hinge member having an inner leaf secured to the said end of the one slide plate and an outer leaf having secured thereto one arm of a first substantially U-shaped jaw member; a second hinge member having an inner leaf secured to the said end of the other slide plate and an outer leaf having secured thereto one arm of a second substantially U-shaped jaw member; an operating lever carried by the handle portion of the housing and rotatable between a first and a second position; coupling means between the operating lever and the two slide plates for effecting reverse movement of the slide plates upon rotation of the operating lever; spring means associated with each hinge member and normally biasing the hinge members such that the said outer leaf of each spring member abuts against opposed walls of the cover plate which define the said light passage; the arrangement being such that movement of the operating lever to the second position results in a camming action between the outer leaves of the hinge members and the opposed walls of the cover plate thereby to bring the free ends of the jaw members into engagement with the film carried by the platform means.

9. The invention as recited in claim 8, wherein the free end of each jaw member is provided with a plurality of spaced burrs which partially penetrate the film as the operating lever is moved from the first to the second position.

10. The invention as recited in claim 9, wherein the free edge of each jaw member includes a continuous burr which engages the film when the operating lever is moved to the second position.

11. The invention as recited in claim 9, including a second set of slide plates mounted for linear movement within the housing in a direction normal to movement of the said first and second slide plates, each plate carrying hinge members and jaw members corresponding to those of the said first and second slide plates; means coupling the second set of slide plates to the operating lever for effecting reverse movement thereof in response to rotation of the operating lever; and a plurality of spaced detents formed in the free ends of the jaw members associated with the second set of slide plates, said detents having smooth surfaces which engage the film upon rotation of the operating lever from the first to the second position.

References Cited in the file of this patent

UNITED STATES PATENTS

| | | |
|---|---|---|
| 2,248,646 | Small | July 8, 1941 |
| 2,260,672 | Johanson | Oct. 28, 1941 |
| 2,294,585 | Thomson | Sept 1, 1942 |
| 2,824,491 | Hoffmaster | Feb. 25, 1958 |
| 2,995,979 | Gordon et al. | Aug. 15, 1961 |

OTHER REFERENCES

Germany, application 1,037,839, printed Aug. 28, 1958.